United States Patent
Sinha et al.

(10) Patent No.: US 12,052,234 B2
(45) Date of Patent: Jul. 30, 2024

(54) TLS SERVER CERTIFICATE REPLACEMENT USING A NOTIFICATION MECHANISM

(71) Applicant: VMware LLC, Palo Alto, CA (US)

(72) Inventors: Kundan Sinha, Bangalore (IN); Chandan Nandagopal Reddy, Bangalore (IN); John E. Brezak, Camano Island, WA (US); Shalini Krishna, Bangalore (IN)

(73) Assignee: VMware LLC, Palo Alto, CA (US)

( * ) Notice: Subject to any disclaimer, the term of this patent is extended or adjusted under 35 U.S.C. 154(b) by 300 days.

(21) Appl. No.: 17/711,078

(22) Filed: Apr. 1, 2022

(65) Prior Publication Data
US 2023/0239287 A1    Jul. 27, 2023

(30) Foreign Application Priority Data
Jan. 21, 2022 (IN) .............................. 202241003663

(51) Int. Cl.
*H04L 9/40* (2022.01)
*H04L 9/32* (2006.01)

(52) U.S. Cl.
CPC ........ *H04L 63/0823* (2013.01); *H04L 9/3263* (2013.01); *H04L 9/3268* (2013.01); *H04L 63/166* (2013.01)

(58) Field of Classification Search
CPC . H04L 63/0823; H04L 9/3263; H04L 9/3268; H04L 63/166
See application file for complete search history.

(56) References Cited

U.S. PATENT DOCUMENTS

| | | | |
|---|---|---|---|
| 2005/0033957 A1* | 2/2005 | Enokida | H04L 63/12 726/4 |
| 2020/0267004 A1* | 8/2020 | Lounsberry | H04L 9/3265 |

* cited by examiner

*Primary Examiner* — Huan V Doan
(74) *Attorney, Agent, or Firm* — Quarles & Brady LLP (57) ABSTRACT

The present disclosure is related to devices, systems, and methods for TLS server certificate replacement using a notification mechanism. An example method can include establishing a first secure TLS connection between a client and a server verified by a first TLS certificate, creating a subscription for the client to receive a notification associated with a TLS certificate change, loading a second certificate to replace the first certificate, providing a notification to the client, wherein the notification includes the second certificate and a web token scoped to the client, and establishing a second secure TLS connection verified by the second TLS certificate responsive to the client verifying the web token.

20 Claims, 5 Drawing Sheets

TLS SERVER CERTIFICATE REPLACEMENT USING A NOTIFICATION MECHANISM

RELATED APPLICATION

Benefit is claimed under 35 U.S.C. 119(a)-(d) to Foreign Application Serial No. 202241003663 filed in India entitled "TLS SERVER CERTIFICATE REPLACEMENT USING A NOTIFICATION MECHANISM", on Jan. 21, 2022, by VMware, Inc., which is herein incorporated in its entirety by reference for all purposes.

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may utilize data storage and/or data processing services from the provider in order to run applications that handle the enterprises' core business and operational data. The applications may be proprietary and used exclusively by the enterprise or made available through a network for anyone to access and use.

Virtual computing instances (VCIs), such as virtual machines and containers, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a software-defined data center, storage resources may be allocated to VCIs in various ways, such as through network attached storage (NAS), a storage area network (SAN) such as fiber channel and/or Internet small computer system interface (iSCSI), a virtual SAN, and/or raw device mappings, among others.

DETAILED DESCRIPTION

Transport Layer Security (TLS) is a protocol that establishes an encrypted session between two computers on the Internet. TLS can verify the identity of the server and prevent hackers from intercepting data. Digital certificates are digital files that are used to certify the ownership of a public key. TLS certificates (sometimes referred to herein as "server certificates") are a type of digital certificate, issued by a Certificate Authority (CA). The CA can sign the certificate, thereby certifying that they have verified that it belongs to the owners of the domain name which is the subject of the certificate.

In general, a TLS certificate operates according to the following. When a client tries to connect to a server, the server sends the client its TLS certificate. The client verifies the server's certificate using CA certificates that are present on the client to establish a secure connection. This verification process using public key cryptography to prove the CA signed the certificate. As long as the client trusts the CA, this demonstrates that the client is communicating with the server certificate's subject.

TLS certificates are commonly configured to expire after a period of time (e.g., 3 to 6 months). When a server TLS certificate expires, it may be replaced with a new TLS certificate. When the server TLS certificate is replaced, clients may utilize one or more CA certificates in order to verify the new server certificate or else they may no longer be able to open a secure TLS connection to the server. In many instances, this is not a problem if the server certificate is issued by a well-known CA (e.g., Verisign, Digicert, Entrust, etc.) where their trust anchors will typically be present with the default configuration of most clients and consequently the chain of trust will not be broken after server certificate replacement.

However, in instances where the server certificate is issued by a custom CA or is a self-signed certificate, clients by default will not have the necessary means to verify the server certificate. Previous approaches facing this issue need manual intervention by cryptography administrators to configure the client(s) with the means to verify the chain of trust. As a result, when the connection between server and client is snapped by the expiration of a TLS certificate, for instance, it takes additional downtime for the administrator to fix the trust issue. Manual intervention by cryptographic administrators may be undesirably time-consuming and costly.

Embodiments of the present disclosure can provide a mechanism for clients to subscribe to server TLS certificate change and for a server to securely communicate the same to the clients. During this subscription process, a client can expose a unique notification endpoint which can be a https URL along with a thumbprint of the endpoint certificate belonging to the client. The subscriptions can be created at the time of bootup or at the time of client registration with the server (which typically follows the Trust on first use (TOFU) scheme) and, in some embodiments, only an entity with administrator privileges will be allowed to create a subscription.

Upon creation of the subscriptions, the clients can be notified about the server certificate change whenever it occurs. The clients can be notified on their respective notification endpoints securely on a TLS channel with the endpoint certificate verified using the respective thumbprint provided during subscription. In some embodiments, the payload of this notification contains the new server certificate. In some embodiments, the payload of this notification contains a CA certificate which can be utilized to verify the new server certificate.

When the server certificate is replaced and the client is notified, embodiments herein can leverage the mutual Oauth2-based trust relationship already established between the client, the server, and the authorization server to allow the client to verify the identity of the server. In some embodiments, the authorization header of the notification contains a JSON Web Token (JWT) scoped specifically to a particular client. When, for instance, the client previously registered with the server, the client added the authorization server as an OpenID connect (OIDC) trust provider to enable Oauth2-based authentication and authorization with the server. The JWT token in the header can be verified using the JSON Web Key Set (JWKS), which may be prefetched and periodically refreshed from the authorization server, which is the OIDC provider. If the JWT token can be verified by the available JWKS by the client, then it confirms that the notification originated from a valid source, and the server has successfully authenticated with the client. In some embodiments, the specific claims of the token are used for authorization by the client. At the time of subscription, the client can specify the access token audience, which defines the token policy for the client. The policy can be registered with the authorization server. The token that is issued by the authorization server can be placed into the header and can be specifically scoped for that client based on the provided audience, conforming to the Oauth2 protocol. It is noted that the term "server" may be occasionally used herein in a cumulative sense to refer to an authorization server and a different (e.g., resource) server.

As referred to herein, a virtual computing instance (VCI) covers a range of computing functionality. VCIs may include non-virtualized physical hosts, virtual machines (VMs), and/or containers. A VM refers generally to an isolated end user space instance, which can be executed within a virtualized environment. Other technologies aside from hardware virtualization that can provide isolated end user space instances may also be referred to as VCIs. The term "VCI" covers these examples and combinations of different types of VCIs, among others. VMs, in some embodiments, operate with their own guest operating systems on a host using resources of the host virtualized by virtualization software (e.g., a hypervisor, virtual machine monitor, etc.).

Multiple VCIs can be configured to be in communication with each other in an SDDC. In such a system, information can be propagated from a client (e.g., an end user) to at least one of the VCIs in the system, between VCIs in the system, and/or between at least one of the VCIs in the system and a server. SDDCs are dynamic in nature. For example, VCIs and/or various application services, may be created, used, moved, or destroyed within the SDDC. When VCIs are created, various processes and/or services start running and consuming resources. As used herein, "resources" are physical or virtual components that have a finite availability within a computer or SDDC. For example, resources include processing resources, memory resources, electrical power, and/or input/output resources.

While the specification refers generally to VCIs, the examples given could be any type of data compute node, including physical hosts, VCIs, non-VCI containers, and hypervisor kernel network interface modules. Embodiments of the present disclosure can include combinations of different types of data compute nodes.

Figure 1:
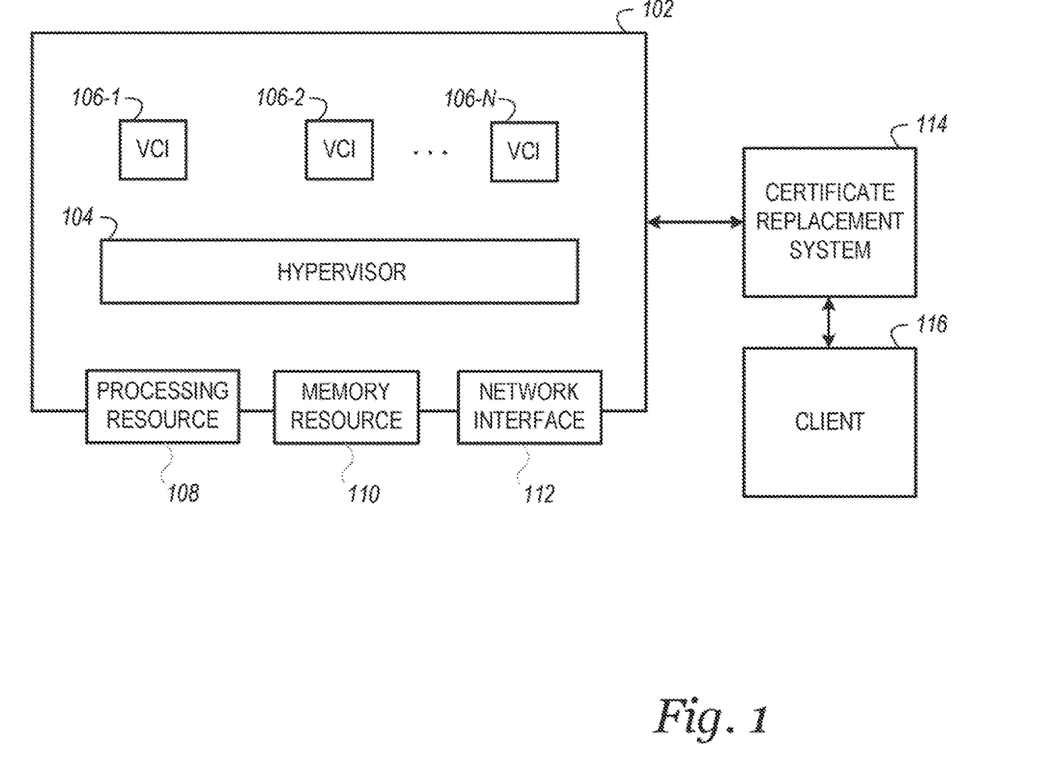
FIG. 1 is a diagram of a host and a system for TLS server certificate replacement using a notification mechanism according to one or more embodiments of the present disclosure.

FIG. 1 is a diagram of a host and a system for TLS server certificate replacement using a notification mechanism according to one or more embodiments of the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of virtual computing instances 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. The host 102 can be in communication with a certificate replacement system 114. An example of the certificate replacement system 114 is illustrated and described in more detail below. In some embodiments, the certificate replacement system 114 can be a server, such as a web server. In some embodiments, the certificate replacement system 114 can refer to an authorization server.

The certificate replacement system 114 can be in communication with a client 116. The client 116 is any device that can establish a TLS connection with a server. In some embodiments, the client 116 is a server. In some embodiments, the client 116 is computing device (e.g., end user device). In some embodiments, the client 116 is a secure channel. In some embodiments, the client 116 is a network virtualization platform.

Figure 2:
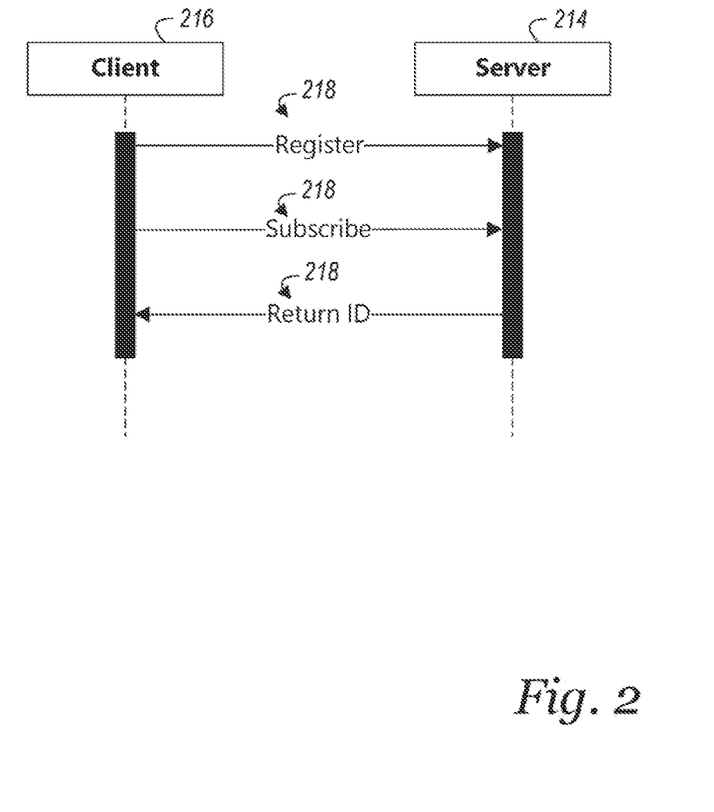
FIG. 2 is a flow chart associated with client subscription according to one or more embodiments of the present disclosure.

FIG. 2 is a flow chart associated with client subscription according to one or more embodiments of the present disclosure. In some embodiments, a client 216 registers an authorization server as an OpenID Connect (OIDC) provider and, before the steps illustrated in FIG. 2, the authorization server is already aware of the client 216 token policy and can issue JWT tokens scoped specifically for the client 216.

The client 216 registers with the server 214 at step 218. The registration can follow a Trust On First Use (TOFU) scheme. In some embodiments, the server 214 certificate is retrieved and cached by the client 216. In other embodiments, the issuing CA of the server 214 certificate is exchanged. The client 216 subscribes to the server 214 certificate change at 220. The client 216 can invoke a Representational state transfer (REST) Application Programming Interface (API) exposed by the server 214 with the information needed to create a subscription record. The client 216 can provide its unique notification endpoint, the corresponding thumbprint of the endpoint certificate, and the access token audience for creation of the subscription. The server 214 returns a unique subscription ID to the client 216 at step 222 upon successful creation of the subscription.

Figure 3:
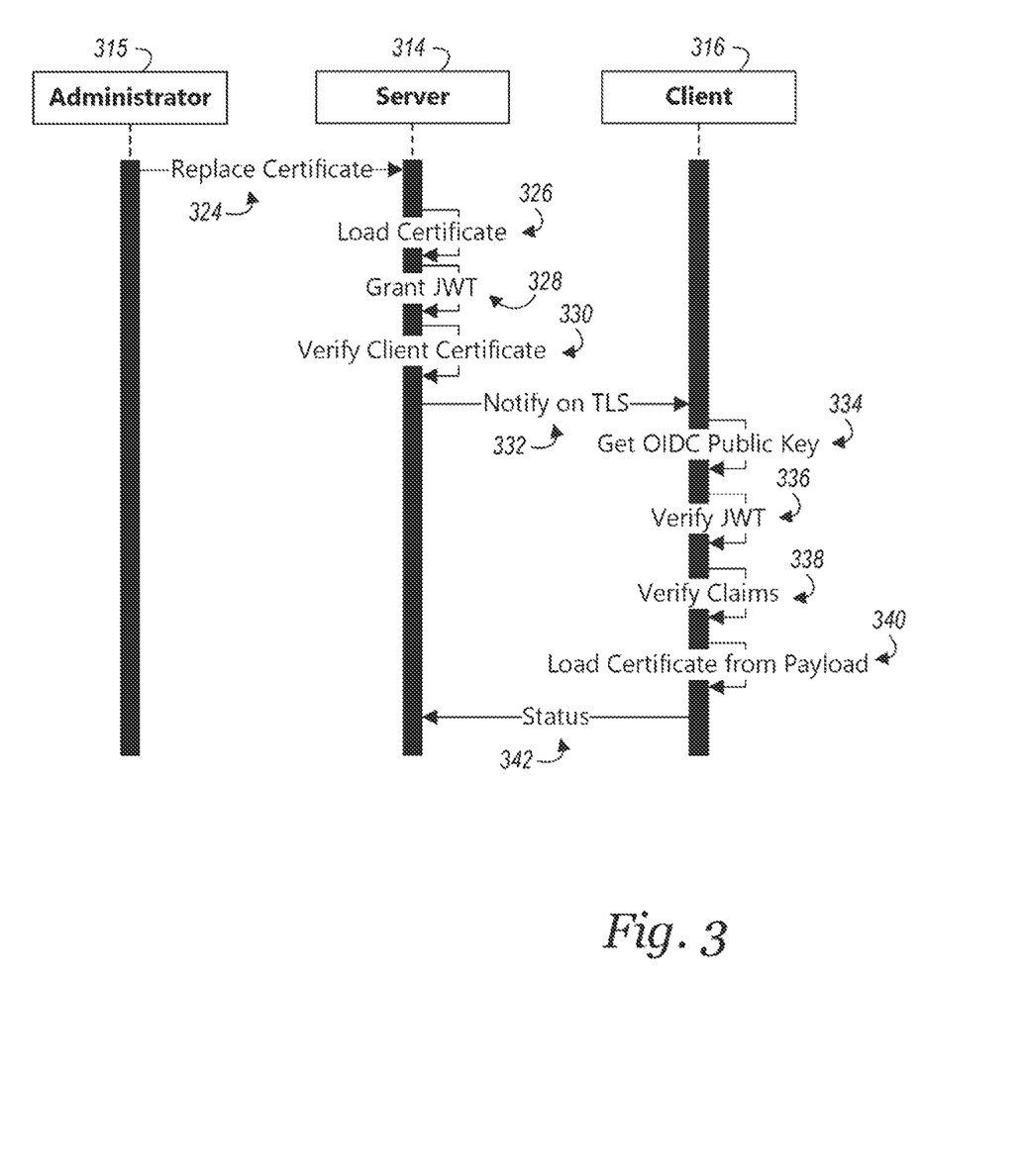
FIG. 3 is a flow chart associated with a notification mechanism used to communicate a server certificate change to a subscribed client according to one or more embodiments of the present disclosure.

FIG. 3 is a flow chart associated with a notification mechanism used to communicate a server certificate change to a subscribed client according to one or more embodiments of the present disclosure. An administrator (user) 315 initiates certificate renewal and/or replacement at 324. In response, the server 314 loads the new certificate at 326. The server 314 begins to notify the client(s) at 328 by first being granted a JWT token from the authorization server. The token can be scoped with respect to the access token audience, which was provided to the server 314 previously during subscription (described above in connection with FIG. 2). The client notification endpoint certificate is verified at 330 using the thumbprint provided to the server 314 previously during subscription. Responsive to successful verification of the client notification endpoint certificate, the server 314 begins to notify the client 316 at 332. The server 314 can notify the client 316 securely on a TLS channel with the new server certificate embedded in the payload of the notification.

At 334, the cached JWKS are retrieved for verification of the JWT. The JWKS can be prefetched or refreshed from the OIDC provider (e.g., the authorization server) periodically by the client 316. The JWT present in the header is extracted at 336 and verified by the client 316 using the JWKS. Successful verification of the JWT results in successful authentication to the client 316. The claims of the JWT can be verified at 338. The token can contain the claims involved in providing specific access or authorizing the client call. At 340, the payload of the notification can be extracted. In some embodiments, the payload contains the new server certificate. In some embodiments, the payload contains the CA certificates and the unique client subscription ID, which the client can use to verify the server 314 identity. The server certificate is now trusted by the client 316. The client can now make secure TLS connections back to the server 314. At 342, the status of the client 316 can be sent back to the server 314.

Figure 4:
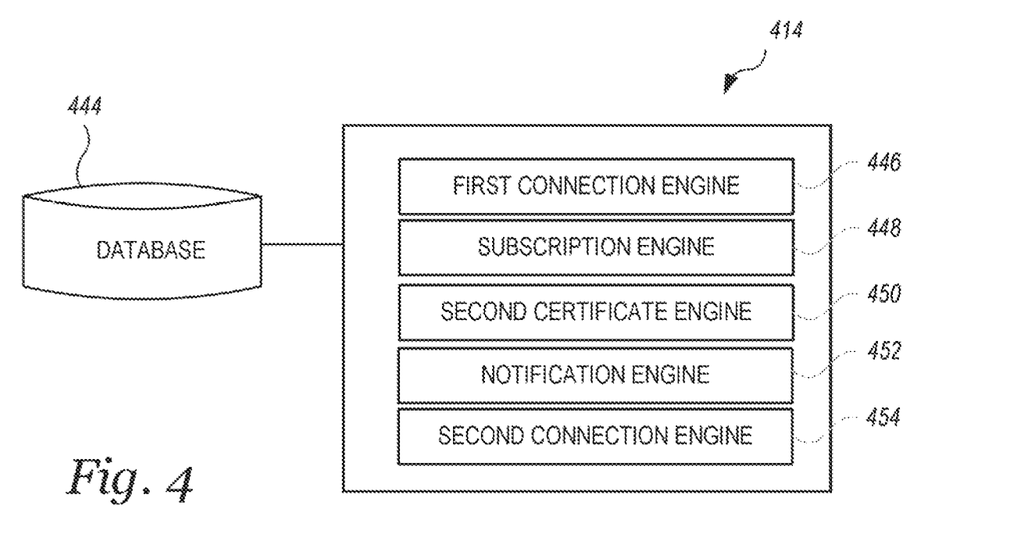
FIG. 4 is a diagram of a system for TLS server certificate replacement using a notification mechanism according to one or more embodiments of the present disclosure.

FIG. 4 is a diagram of a system 414 for TLS server certificate replacement using a notification mechanism according to one or more embodiments of the present disclosure. The system 414 can include a database 444 and/or a number of engines, for example first connection engine 446, subscription engine 448, second certificate engine 450, notification engine 452, and/or second connection engine 454, and can be in communication with the database 444 via a communication link. The system 414 can include additional or fewer engines than illustrated to perform the various functions described herein. The system can represent program instructions and/or hardware of a machine (e.g., machine 556 as referenced in FIG. 5, etc.). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, a field programmable gate array, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the first connection engine 446 can include a combination of hardware and program instructions that is configured to establish a first secure TLS connection between a client and a server verified by a first TLS certificate. The first TLS certificate can be a self-signed certificate. The first certificate can be issued by a custom certificate authority. In some embodiments, the subscription engine 448 can include a combination of hardware and program instructions that is configured to create a subscription for the client to receive a notification associated with a TLS certificate change. The TLS certificate change can break a chain of trust of the first TLS certificate. Creating a subscription can include receiving, from the client, an identification of a notification endpoint, a thumbprint of a certificate corresponding to the endpoint, and an access token audience. In some embodiments, the second certificate engine 450 can include a combination of hardware and program instructions that is configured to load a second certificate to replace the first certificate. In some embodiments, the notification engine 452 can include a combination of hardware and program instructions that is configured to provide a notification to the client, wherein the notification includes the second certificate and a web token scoped to the client. The web token can be a JSON web token scoped for the client, and the client verifying the web token can include retrieving JSON web key sets (JWKS) and verifying the JSON web token based on the JWKS. The notification can be provided responsive to verifying the certificate corresponding to the endpoint based on the thumbprint. In some embodiments, the second connection engine 454 can include a combination of hardware and program instructions that is configured to establish a second secure TLS connection verified by the second TLS certificate responsive to the client verifying the web token.

Figure 5:
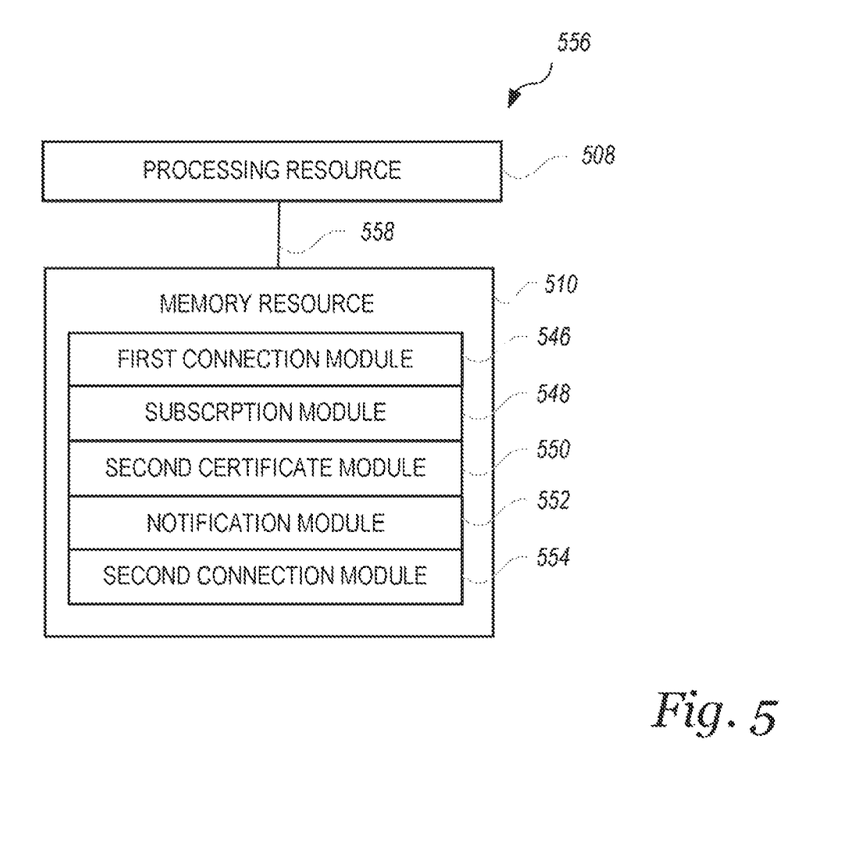
FIG. 5 is a diagram of a machine for TLS server certificate replacement using a notification mechanism according to one or more embodiments of the present disclosure.

FIG. 5 is a diagram of a machine for TLS server certificate replacement using a notification mechanism according to one or more embodiments of the present disclosure. The machine 556 can utilize software, hardware, firmware, and/or logic to perform a number of functions. The machine 556 can be a combination of hardware and program instructions configured to perform a number of functions (e.g., actions). The hardware, for example, can include a number of processing resources 508 and a number of memory resources 510, such as a machine-readable medium (MRM) or other memory resources 510. The memory resources 510 can be internal and/or external to the machine 556 (e.g., the machine 556 can include internal memory resources and have access to external memory resources). In some embodiments, the machine 556 can be a virtual computing instance (VCI). The program instructions (e.g., machine-readable instructions (MRI)) can include instructions stored on the MRM to implement a particular function (e.g., an action such as receiving a plurality of metrics, as described herein). The set of MRI can be executable by one or more of the processing resources 508. The memory resources 510 can be coupled to the machine 556 in a wired and/or wireless manner. For example, the memory resources 510 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 510 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change memory (PCM), 3D cross-point, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, magnetic memory, optical memory, and/or a solid state drive (SSD), etc., as well as other types of machine-readable media.

The processing resources 508 can be coupled to the memory resources 510 via a communication path 558. The communication path 558 can be local or remote to the machine 556. Examples of a local communication path 558 can include an electronic bus internal to a machine, where the memory resources 510 are in communication with the processing resources 408 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 558 can be such that the memory resources 510 are remote from the processing resources 508, such as in a network connection between the memory resources 510 and the processing resources 508. That is, the communication path 558 can be a network connection. Examples of such a network connection can include a local area network (LAN), wide area network (WAN), personal area network (PAN), and the Internet, among others.

As shown in FIG. 5, the MRI stored in the memory resources 510 can be segmented into a number of modules 546, 548, 550, 552, 554 that when executed by the processing resources 508 can perform a number of functions. As used herein a module includes a set of instructions included to perform a particular task or action. The number of modules 546, 548, 550, 552, 554 can be sub-modules of other modules. For example, the second connection module 554 can be a sub-module of the first connection module 546 and/or can be contained within a single module. Furthermore, the number of modules 546, 548, 550, 552, 554 can comprise individual modules separate and distinct from one another. Examples are not limited to the specific modules 546, 548, 550, 552, 554 illustrated in FIG. 5.

Each of the number of modules 546, 548, 550, 552, 554 can include program instructions and/or a combination of hardware and program instructions that, when executed by a processing resource 508, can function as a corresponding engine as described with respect to FIG. 4. For example, the first connection module 546 can include program instructions and/or a combination of hardware and program instructions that, when executed by a processing resource 508, can function as the first connection engine 446, though embodiments of the present disclosure are not so limited.

The machine 556 can include a first connection module 546, which can include instructions to establish a first secure TLS connection between a client and a server verified by a first TLS certificate. The machine 556 can include a subscription module 548, which can include instructions to create a subscription for the client to receive a notification associated with a TLS certificate change. The machine 556 can include a second certificate module 550, which can include instructions to load a second certificate to replace the first certificate.

The machine 556 can include a notification module 552, which can include instructions to provide a notification to the client, wherein the notification includes the second certificate and a web token scoped to the client. The machine 556 can include a second connection module 554, which can include instructions to establish a second secure TLS connection verified by the second TLS certificate responsive to the client verifying the web token.

Figure 6:
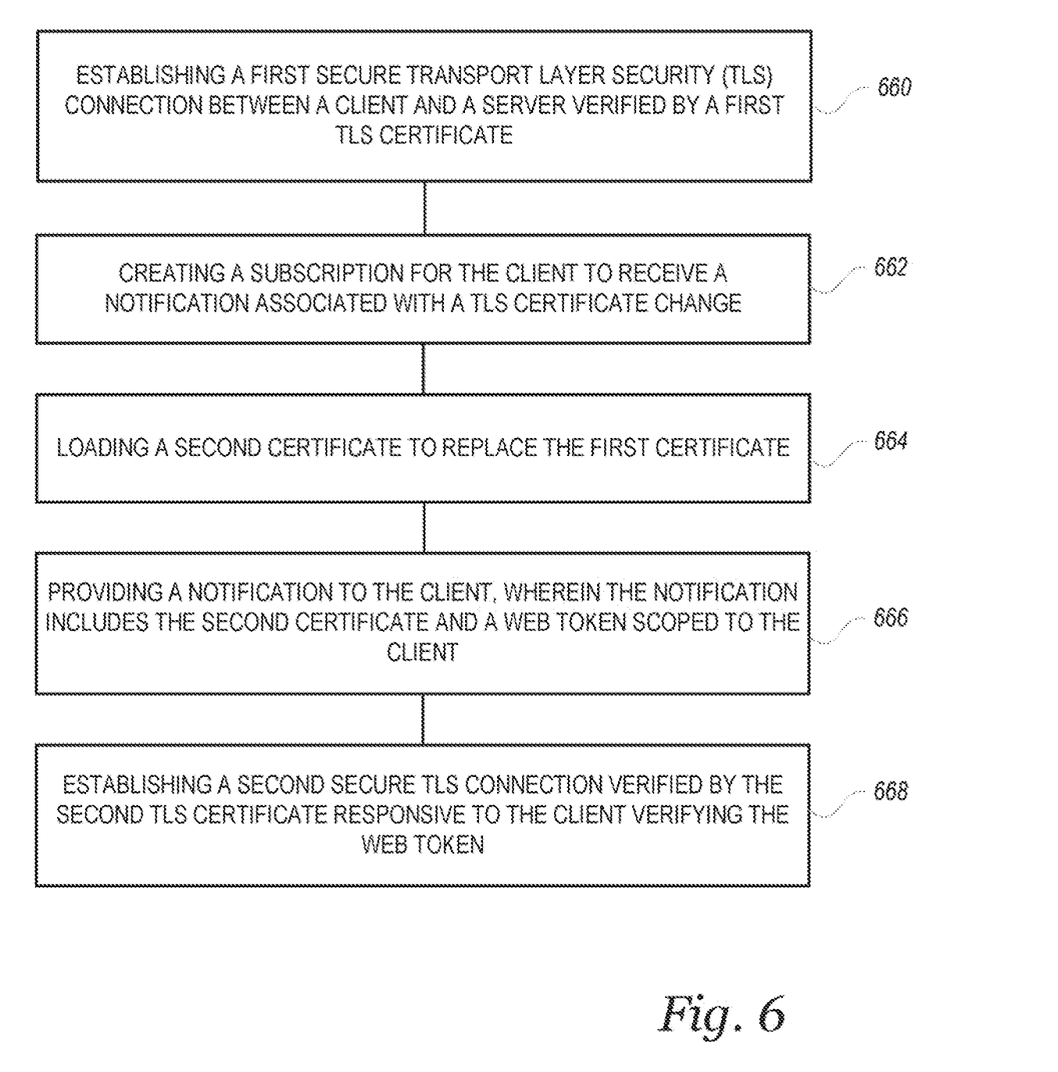
FIG. 6 illustrates a method of TLS server certificate replacement using a notification mechanism according to one or more embodiments of the present disclosure.

FIG. 6 illustrates a method of TLS server certificate replacement using a notification mechanism according to one or more embodiments of the present disclosure. At 660, the method includes establishing a first secure Transport Layer Security (TLS) connection between a client and a server verified by a first TLS certificate. At 662, the method includes creating a subscription for the client to receive a notification associated with a TLS certificate change. At 664, the method includes loading a second certificate to replace the first certificate. At 666, the method includes providing a notification to the client, wherein the notification includes the second certificate and a web token scoped to the client. At 668, the method includes establishing a second secure TLS connection verified by the second TLS certificate responsive to the client verifying the web token.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 508 in FIG. 5. A group or plurality of similar elements or components may generally be referred to herein with a single element number. For example, a plurality of reference elements 104-1, 104-2, . . . , 104-N may be referred to generally as 104. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    establishing a first secure Transport Layer Security (TLS) connection between a client and a server verified by a first TLS certificate;
    creating a subscription for the client to receive a notification associated with a TLS certificate change;
    loading a second certificate to replace the first certificate;
    providing a notification to the client, wherein the notification includes the second certificate and a web token scoped to the client; and
    establishing a second secure TLS connection verified by the second TLS certificate responsive to the client verifying the web token.

2. The method of claim 1, wherein the method includes receiving the first TLS certificate and the second TLS certificate issued by a custom certificate authority.

3. The method of claim 1, wherein the first TLS certificate and the second TLS certificate are self-signed certificates.

4. The method of claim 1, wherein creating the subscription includes receiving, from the client, an identification of a notification endpoint, a thumbprint of a certificate corresponding to the endpoint, and an access token audience.

5. The method of claim 4, wherein the method includes providing the notification to the client responsive to verifying the certificate corresponding to the endpoint based on the thumbprint.

6. The method of claim 4, wherein the web token is a JSON web token scoped for the client, and wherein the client verifying the web token includes retrieving JSON web key sets (JWKS) and verifying the JSON web token based on the JWKS.

7. The method of claim 1, wherein the method includes breaking a chain of trust of the first TLS certificate.

8. A non-transitory machine-readable medium having instructions stored thereon which, when executed by a processor, cause the processor to:
    establish a first secure Transport Layer Security (TLS) connection between a client and a server verified by a first TLS certificate;
    create a subscription for the client to receive a notification associated with a TLS certificate change;
    load a second certificate to replace the first certificate;
    provide a notification to the client, wherein the notification includes the second certificate and a web token scoped to the client; and
    establish a second secure TLS connection verified by the second TLS certificate responsive to the client verifying the web token.

9. The medium of claim 8, including instructions to receive the first TLS certificate and the second TLS certificate issued by a custom certificate authority.

10. The medium of claim 8, wherein the first TLS certificate and the second TLS certificate are self-signed certificates.

11. The medium of claim 8, wherein the instructions to create the subscription include instructions to receive, from the client, an identification of a notification endpoint, a thumbprint of a certificate corresponding to the endpoint, and an access token audience.

12. The medium of claim 11, including instructions to provide the notification to the client responsive to verifying the certificate corresponding to the endpoint based on the thumbprint.

13. The medium of claim 11, wherein the web token is a JSON web token scoped for the client, and wherein the client verifying the web token includes retrieving JSON web key sets (JWKS) and verifying the JSON web token based on the JWKS.

14. The medium of claim 8, wherein the method includes breaking a chain of trust of the first TLS certificate.

15. A system, comprising:
    a first connection engine configured to establish a first secure Transport Layer Security (TLS) connection between a client and a server verified by a first TLS certificate;
    a subscription engine configured to create a subscription for the client to receive a notification associated with a TLS certificate change;
    a second certificate engine configured to load a second certificate to replace the first certificate;
    a notification engine configured to provide a notification to the client, wherein the notification includes the second certificate and a web token scoped to the client; and
    a second connection engine configured to establish a second secure TLS connection verified by the second TLS certificate responsive to the client verifying the web token.

16. The system of claim 15, wherein the first connection engine is configured to receive the first TLS certificate and the second TLS certificate issued by a custom certificate authority.

17. The system of claim 15, wherein the first TLS certificate and the second TLS certificate are self-signed certificates.

18. The system of claim 15, wherein the subscription engine is configured to receive, from the client, an identification of a notification endpoint, a thumbprint of a certificate corresponding to the endpoint, and an access token audience.

19. The system of claim 18, wherein the notification engine is configured to provide the notification to the client responsive to verifying the certificate corresponding to the endpoint based on the thumbprint.

20. The system of claim 18, wherein the web token is a JSON web token scoped for the client, and wherein the client verifying the web token includes retrieving JSON web key sets (JWKS) and verifying the JSON web token based on the JWKS.

* * * * *